US010069729B2

(12) United States Patent
Wood et al.

(10) Patent No.: US 10,069,729 B2
(45) Date of Patent: Sep. 4, 2018

(54) SYSTEM AND METHOD FOR THROTTLING TRAFFIC BASED ON A FORWARDING INFORMATION BASE IN A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 15/231,353

(22) Filed: Aug. 8, 2016

(65) Prior Publication Data

US 2018/0041438 A1 Feb. 8, 2018

(51) Int. Cl.
| | | |
|---|---|---|
| *H04J 3/14* | (2006.01) | |
| *H04L 12/745* | (2013.01) | |
| *H04L 12/825* | (2013.01) | |
| *H04L 12/773* | (2013.01) | |

(52) U.S. Cl.
CPC ............ *H04L 45/748* (2013.01); *H04L 45/60* (2013.01); *H04L 47/25* (2013.01)

(58) Field of Classification Search
CPC ........ H04L 45/748; H04L 45/60; H04L 47/25
See application file for complete search history.

(56) References Cited

U.S. PATENT DOCUMENTS

| 817,441 A | 4/1906 | Niesz |
|---|---|---|
| 4,309,569 A | 1/1982 | Merkle |
| 4,921,898 A | 5/1990 | Lenney |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

IEEE (An effective congestion control scheme in content centric networking, Tongmin Fu, Yang li, tao lin,hongyan tan,hui tang and cong ci, Dec. 14-16, 2012) (Year: 2012).*

(Continued)

*Primary Examiner* — Maharishi V Khirodhar

(57) ABSTRACT

One embodiment provides a system that facilitates efficient communication based on a forwarding information base (FIB). The system receives, by an intermediate node, a first interest which includes a name and maximum interest information which indicates whether to forward a subsequent interest with a same name prefix as the first interest. In response to obtaining a first entry from a FIB based on the name for the first interest, the system adds to the first entry, for an outgoing interface corresponding to an arrival interface of the first interest, the maximum interest information included in the first interest as an interest limit for the first entry. In response to determining that the interest limit for the first entry is reached, the system refrains from forwarding the subsequent interest, thereby facilitating the intermediate node to manage traffic based on information in the forwarding information base provided by a content producer.

20 Claims, 9 Drawing Sheets

(56) References Cited

U.S. PATENT DOCUMENTS

| | | |
|---|---|---|
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |

(56) References Cited

U.S. PATENT DOCUMENTS

| | | |
|---|---|---|
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |

(56) References Cited

U.S. PATENT DOCUMENTS

| | | |
|---|---|---|
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1* | 4/2011 | Jacobson ............ H04L 45/745 370/392 |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1* | 7/2013 | Lee ............ H04L 47/127 370/231 |
| 2013/0182931 A1 | 7/2013 | Fan |
| 2013/0185406 A1 | 7/2013 | Choi |

(56) References Cited

U.S. PATENT DOCUMENTS

| | | |
|---|---|---|
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0088514 A1* | 3/2016 | Ohnishi ............... H04W 24/08 370/230 |
| 2016/0110466 A1 | 4/2016 | Uzun |
| 2016/0134915 A1* | 5/2016 | Oran ................. H04N 21/2662 725/95 |
| 2016/0171184 A1 | 6/2016 | Solis |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| EP | 2323346 | 5/2011 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |
| WO | 2015084327 | 6/2015 |

OTHER PUBLICATIONS

IEEE(Efficient Multipath forwarding and congestion control without route-labeling in CCN, Din Nguyen, Masaki Fukushima,kohei sugiyama and Atsushi Tagami, of Jun. 8-12, 2015) (Year: 2015).*

An improved Hop-by-Hop interest shaper for congestion control in named data networking, yaogong Wang, Natalya Rozhnova, Ashok Narayanan and David Oran, Feb. 13, 2008) (Year: 2008).*

IEEE( An explicit congestion control Algorithm for named data networking, yongmao Ren, Jun Li, Shanshan Shi, Lingling Li and Guodong Wang, of Apr. 10-14, 2016) (Year: 2016).*

IEEE( Network assisted congestion control for inforamtion centric networking, Anselme Ndikumana, Saeed Ullah, Rossi Kamal,Kyi Thar,Hyo Sung Kang,Seung Il, Moon and Choong seon Hong, of Aug. 19-21, 2015) (Year: 2015).*

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

(56) References Cited

OTHER PUBLICATIONS

Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," in Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASIER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

(56) References Cited

OTHER PUBLICATIONS

Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* * figures 1,2*.
Marc Mosko et al "All-In-One Streams for Content Centric Networks", May 24, 2015, retrieved from the Internet: http://www.ccnx.org/pubs/AllInOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1p. 2, col. 1-2 Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.

(56) References Cited

OTHER PUBLICATIONS

D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (Pursuit)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography—About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," In Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).

(56) References Cited

OTHER PUBLICATIONS

D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information—centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

\* cited by examiner

SYSTEM AND METHOD FOR THROTTLING TRAFFIC BASED ON A FORWARDING INFORMATION BASE IN A CONTENT CENTRIC NETWORK

RELATED APPLICATIONS

The subject matter of this application is related to the subject matter in the following applications:

- U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");
- U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and
- U.S. patent application Ser. No. 14/579,925, entitled "SYSTEM AND METHOD FOR EFFICIENT NAME-BASED CONTENT ROUTING USING LINK-STATE INFORMATION IN INFORMATION-CENTRIC NETWORKS," by inventor Jose J. Garcia-Luna-Aceves, filed 22 Dec. 2014 (hereinafter "U.S. patent application Ser. No. 14/579,925");

the disclosures of which are herein incorporated by reference in their entirety.

BACKGROUND

Field

This disclosure is generally related to distribution of digital content. More specifically, this disclosure is related to a system and method for throttling traffic to an upstream router or producer based on the number of outstanding interests on the upstream path.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

Because intermediate CCN routers manage the rate at which interests are sent to the network, the routers drive flow control within the network. If many consumers issue unique interests to a single producer, this may result in a denial of service attack on the producer. In a current CCN protocol, the routers do not have real-time information on which to base their forwarding decisions. Thus, the routers will forward interests to an upstream next-hop neighbor node regardless of the possibility of increased congestion. One proposed solution relies on localized knowledge of congestion, while another proposed solution relies on notifications of congestion from upstream producers or routers. However, in the former case, localized knowledge may not work when routes are forced to detect attacks on their own, and in the latter case, notifications that arrive after an attack has already begun do not provide a proactive mechanism to deter attacks.

SUMMARY

One embodiment provides a system that facilitates efficient communication based on a forwarding information base (FIB). During operation, the system receives, by an intermediate node, a first interest which includes a name and maximum interest information, wherein a name is a hierarchically structured variable length identifier that includes contiguous name components ordered from a most general level to a most specific level, and wherein the maximum interest information indicates whether to forward a subsequent interest with a same name prefix as the first interest. In response to obtaining a first entry from a forwarding information base based on the name for the first interest, the system adds to the first entry, for an outgoing interface corresponding to an arrival interface of the first interest, the maximum interest information included in the first interest as an interest limit for the first entry. The system receives the subsequent interest. In response to determining that the interest limit for the first entry is reached, the system refrains from forwarding the subsequent interest, thereby facilitating the intermediate node to manage traffic based on information in the forwarding information base provided by a content producer.

In some embodiments, an entry in the forwarding information base includes: a name prefix which includes one or more contiguous name components of a name; and one or more tuples comprised of an outgoing interface, an interest limit, and a counter which is a number that tracks a number of outstanding interests forwarded on the respective outgoing interface, wherein an outstanding interest is an interest which is forwarded and has not been satisfied by a responsive content object.

In some embodiments, the system allocates the interest limit by transmitting one or more second interests to downstream routers, wherein a second interest includes the name and maximum interest information which is an allocated portion of the interest limit, wherein a sum of the allocated portions is equal to the interest limit. Allocating the interest limit is based on one or more of: an even distribution based on an equal or similar distribution; an uneven distribution based on network conditions; and a dynamic or a static distribution.

In some embodiments, the maximum interest information included in the first interest is a maximum number of outstanding interests to be forwarded based on the name prefix.

In some embodiments, the system determines whether the interest limit for the first entry is reached. The system selects an outgoing interface. In response to determining that the counter for the selected outgoing interface is less than the interest limit, the system forwards the subsequent interest via the selected outgoing interface, and increments by one the counter for the selected outgoing interface. In response to determining that the counter for the selected outgoing interface is not less than the interest limit, the system refrains from forwarding the subsequent interest via the selected outgoing interface.

In some embodiments, the maximum interest information included in the first interest is a maximum rate of interests to be forwarded based on the name prefix.

In some embodiments, the system determines whether the interest limit for the first entry is reached. The system selects an outgoing interface. The system computes a sliding forwarding rate for the first entry based on the selected outgoing interface. In response to determining that the computed rate is less than or equal to the interest limit, the system forwards the subsequent interest via the selected outgoing interface. In response to determining that the computed rate is greater than the interest limit, the system refrains from forwarding the subsequent interest via the selected outgoing interface.

BRIEF DESCRIPTION OF THE FIGURES

In the figures, like reference numerals refer to the same figure elements.

DETAILED DESCRIPTION

Figure 1A:
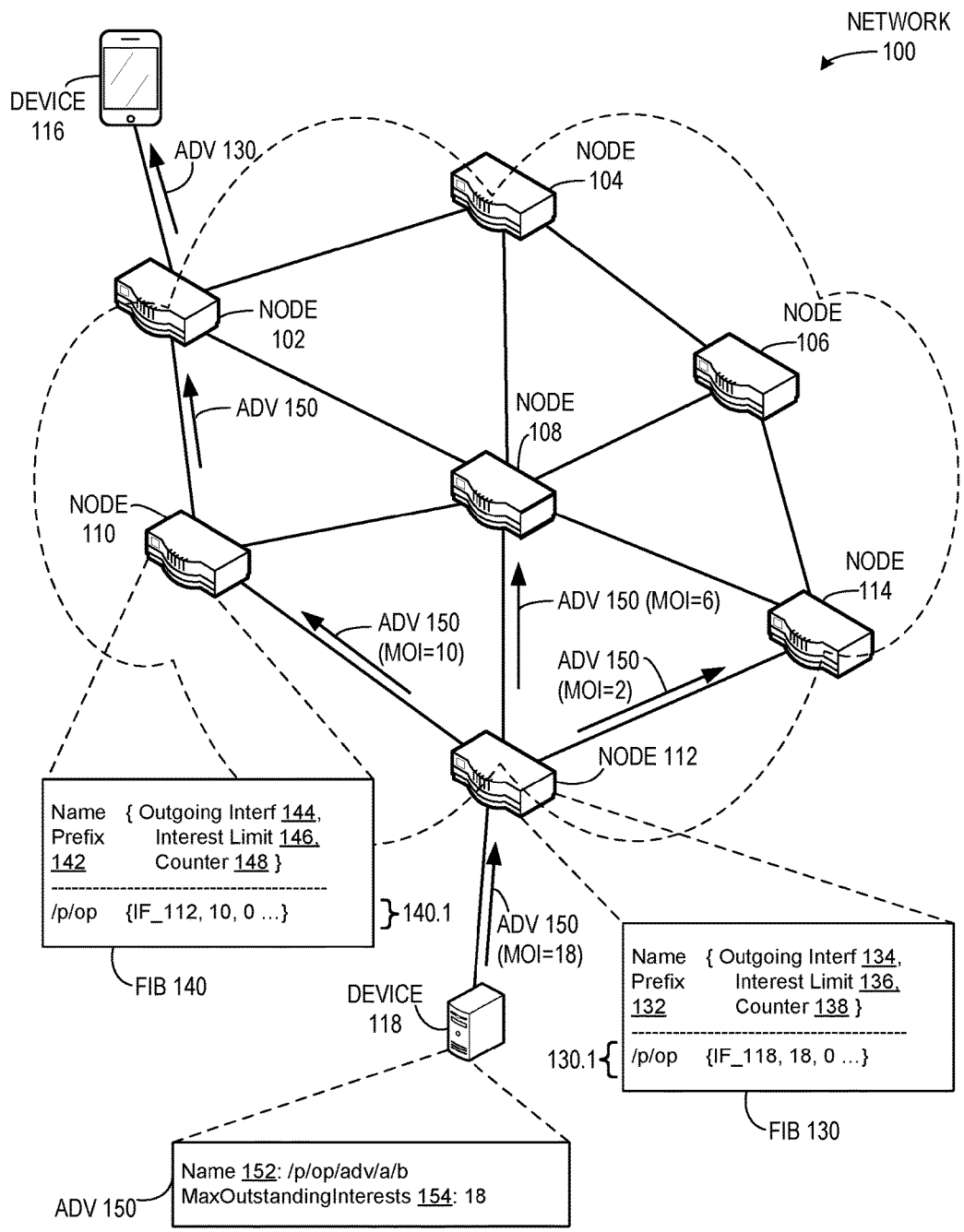
FIG. 1A illustrates an exemplary network which facilitates efficient communication based on a forwarding information base, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system in which a producer advertises maximum interest information to downstream routers, which allows the downstream routers to update their FIB s and manage the rate at which interests are forwarded to the producer. Recall that intermediate CCN routers manage the rate at which interests are sent to the network, and thus drive flow control within the network. If many consumers issue unique interests to a single producer, this may result in a denial of service attack on the producer. In a current CCN protocol, the routers do not have real-time information on which to base their forwarding decisions. Thus, the routers will forward interests to an upstream next-hop neighbor node regardless of the possibility of increased congestion. One proposed solution relies on localized knowledge of congestion, while another proposed solution relies on notifications of congestion from upstream producers or routers. However, in the former case, localized knowledge may not work when routes are forced to detect attacks on their own, and in the latter case, notifications that arrive after an attack has already begun do not provide a proactive mechanism to deter attacks.

Embodiments of the present invention solve the problem of proactively providing real-time information to downstream routers by allowing a producer to include maximum interest information in an advertisement. A receiving router can update a corresponding FIB entry based on the name prefix. The entry can also include a tuple, which includes: the outgoing interface (which corresponds to the arrival interface of the advertisement); an interest limit (which is the maximum interest information of the advertisement); and a counter (which is a number that corresponds to the number of outstanding interests forwarded via the respective interface). An outstanding interest is an interest which has been forwarded, and for which no responsive content object has been received. In other words, an outstanding interest is a previously transmitted and unsatisfied interest.

The maximum interest information included in the advertisement from the producer can include a maximum number of outstanding interests or a maximum rate. The maximum interest information can be used by a router as the interest limit for the corresponding FIB entry. When the interest limit is a maximum number of outstanding interests, the router can set the counter to an initial value of "0." The counter is maintained in the tuple for the outgoing interface which corresponds to the arrival interface of the advertisement. The router can increment the counter by one each time it forwards an interest via the corresponding interface. When the counter reaches the interest limit, the router can no longer forward an interest via the corresponding interface. The router may also decrement the counter by one each time an outstanding interest is satisfied by a responsive content object via the corresponding interface. The router must wait until the counter is less than the interest limit before the router can forward a subsequent interest via the corresponding interface.

When the interest limit is a maximum rate, the router can set the counter to an initial value of "null." The router can use the maximum rate as the interest limit. The router can compute a sliding forwarding rate for the corresponding FIB entry, and compare the computed rate against the maximum rate. The router can only forward interests when the computed rate is less than the maximum rate. The router can compute the sliding forwarding rate based on any sliding average algorithm.

Embodiments of the present system also allow a producer or a router to distribute its interest limit amongst one or more of its downstream routers. For example, a producer P can specify to its adjacent router R that its maximum number of outstanding interests is 8. R may have two downstream neighbors, N1 and N2. R can distribute the interest limit of 8 to N1 and N2 evenly (e.g., 4 each to N1 and N2), or unevenly (e.g., 6 to N1, and 2 to N2). R can distribute the interest limit by replacing the maximum interest information in the received interest with the allocated number for the corresponding downstream node. R can also make a dynamic distribution or allocation decision based on perceived network conditions. For example, R may initially allocate the 8 interest limit as 6 to N1 and 2 to N2. Upon detecting an increase of traffic from N2 to the upstream interface, R may re-allocate the 8-interest limit as 1 to N1 and 7 to N2. An example of an unevenly distributed throttling is described below in relation to FIG. 1A.

By allowing a producer to transmit an interest which includes maximum interest information, the system allows receiving routers to modify and manage their corresponding FIB entries based on the interest. The FIB modification also allows the routers to subsequently make a forwarding decision for an interest based on the modified FIB entry, which facilitates efficient communication based on FIB s in the network.

Thus, the present system provides improvements to the distribution of digital content, where the improvements are fundamentally technological. Embodiments of the present invention provide a technological solution (e.g., providing maximum interest information in as interest limits in interests to allow intermediate routers to manage their FIBs and forward subsequent incoming interest based on the interest limits) to the technological problem of the efficient, secure, and effective distribution of digital content.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

Face or Interface (or "face" or "interface"): In CCN, the term "face" is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the term "neighbor" is interchangeable with the terms "face" and "interface," referring to an incoming or outgoing interface of an Interest.

"Prefix": In this disclosure, the term "prefix" can be used to refer to either a name of a specific content object or a name prefix for the content object. A routable name prefix can determine the routing of a packet that indicates a request for a piece of data, and includes a name (or a name prefix) for the piece of data. A data consumer can disseminate a request or interest across an information-centric network, which CCN/NDN routers can propagate toward a storage device (e.g., a cache server) or a data producer that can provide the requested data to satisfy the request or interest.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1A illustrates an exemplary network which facilitates efficient communication based on a forwarding information base, in accordance with an embodiment of the present invention. Network 100 can include a consumer or content requesting device 116, a producer or content producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). Network 100 can be a content centric network.

During operation, producer or device 118 can determine to set a limit for a particular name prefix to downstream routers, and advertise "maximum interest information" for setting an interest limit, which allows a downstream router to throttle incoming interests for the name prefix. The maximum interest information can be a maximum number of outstanding interests or a maximum rate of interests. Producer 118 can send an interest or advertisement 150 with a name 152 of "/p/op/adv/a/b" and a maximum outstanding interests ("MOI") field 154 with a value of "18," which indicates that a downstream router cannot forward an interest to an upstream interface if there exists 18 unsatisfied or outstanding interest already forwarded to the same interface. Advertisement 150 can travel through network 100 via intermediate nodes 112, 110, and 102 before reaching consumer or device 116. Each of these intermediate nodes can update their FIBs based on the maximum interest information included in advertisement 150. For example node 112 can have a FIB 130 with entries that include a name prefix 132 and a list of outgoing interfaces 134 which each have a corresponding interest limit 136 and a counter 138. Interest limit 136 corresponds to the maximum interest information received in an advertisement from an upstream node. Counter 138 tracks the number of outstanding interfaces sent to the corresponding interface.

Node 112 can receive advertisement 150 and obtain a matching entry 130.1 from FIB 130 based on the name prefix "/p/op." For the outgoing interface corresponding to the arrival interface of interest 150 (i.e., "IF_118"), node 112 can set the interest limit 136 for that interface to "18," which is the maximum interest information included in interest 150 (i.e., "MOI=18").

Node 112 can also determine to distribute the received interest limit (of 18) for the advertised name prefix "/p/op," and allocate the interest limit to its downstream routers by transmitting one or more interests to the downstream routers. The allocation can be based on an even distribution. The allocation can also be an uneven distribution which is based on perceived network conditions. The allocation can also be dynamic. For example, based on an even distribution, node 112 can update advertisement 150 by replacing MOI 154 with a value of "6" and send the updated advertisement 150 to each of nodes 110, 108, and 114 (not shown). Alternatively, node 112 may determine that it has observed a higher amount of traffic in the past two minutes from node 110, and instead allocate the interest limit of 18 in the following manner: 10 to node 110; 6 to node 108; and 2 to node 114 (as indicated by the various advertisements 150 and the corresponding MOIs.)

Similar to node 112, receiving nodes can update their FIBs based on the maximum interest information included in the interest. For example, node 110, can receive updated advertisement 150 with MOI=10 and obtain a matching entry 140.1 from FIB 140 based on the name prefix "/p/op." For the outgoing interface corresponding to the arrival interface of interest 140 (i.e., "IF_112"), node 110 can set the interest limit 146 for that interface to "10," which is the maximum interest information included in interest 130 (i.e., "MOI=10"). In addition, similar to node 112, node 110 can determine to distribute its received interest limit in a similar manner to its downstream routers. Processing an interest or advertisement with a maximum number of outstanding interests is described below in relation to FIG. 3C.

In some embodiments, instead of including a maximum number of outstanding interests, interest 150 can include a maximum rate of interests, which is used to limit the number of interests that are forwarded by computing and comparing the forwarding rate for a respective entry against the maximum rate. For example, producer 118 can transmit interest 150 to node 112 with a maximum rate of "t," and node 112 can determine to allocate the interest limit evenly to its three downstream routers (i.e., 110, 108 and 114), by replacing the maximum rate in interest 150 with a value of "t/3." Processing an interest or advertisement with a maximum rate is described below in relation to FIG. 3D.

Figure 1B:
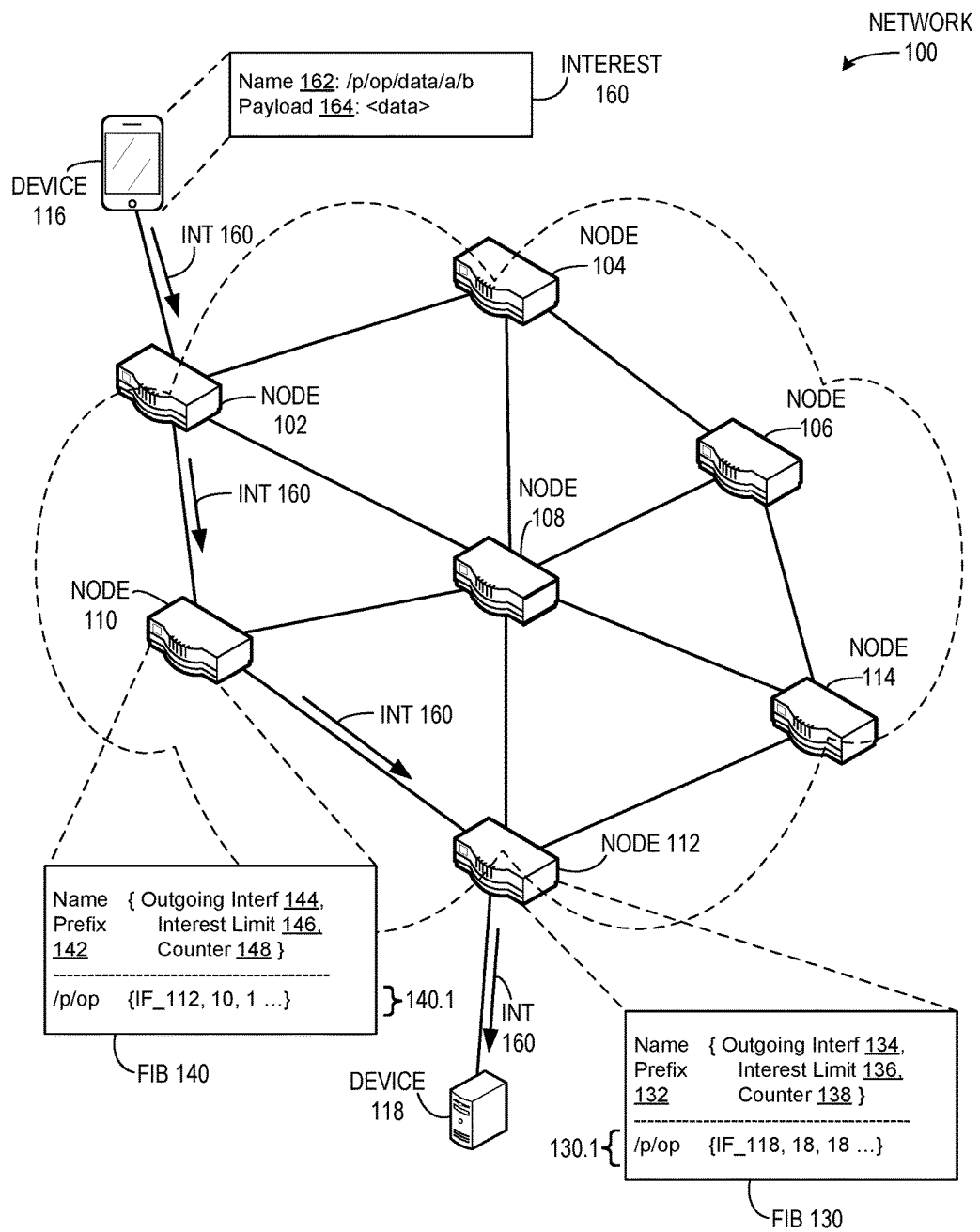
FIG. 1B illustrates an exemplary network which facilitates efficient communication based on a forwarding information base, in accordance with an embodiment of the present invention.

A subsequent interest with the same name prefix as the advertised interest can be processed by a receiving router based on the interest limit previously inserted into the router's FIB. FIG. 1B illustrates an exemplary network which facilitates efficient communication based on a forwarding information base, in accordance with an embodiment of the present invention. Consumer or content consuming device 116 can generate an interest 160 with a name 162 of "/p/op/data/a/b" and an optional payload 164 of "<data>." Interest 160 can travel through network 100 via intermediate nodes 102, 110, and 112 before reaching consumer or device 116. Each of these intermediate nodes, having previously received advertisement 150 and updated their FIBs accordingly, can receive interest 160, obtain the matching FIB entry, select an outgoing interface, obtain the interest limit, determine whether the interest limit is reached, and process interest 160 accordingly. For example, node 110 can receive interest 160 and obtain the matching FIB entry 140.1 from its FIB 140. Node 110 can select the outgoing interface "IF_112" which has a corresponding interest limit of "10" and a counter of "0." Node 110 can determine that the counter is less than the limit, and forward interest 160 via the outgoing interface "IF_112." Node 110 can also increment the counter by one, e.g., from "0" to "1," as reflected in FIB 140 of FIG. 1B.

Subsequently, node 112 can receive interest 160 and obtain the matching FIB entry 130.1 from its FIB 130. Node 110 can select the outgoing interface "IF_118" which has a corresponding interest limit of "18" and a counter of "18" (assuming that node 112 has transmitted 18 unsatisfied or outstanding interests for the same name prefix via this interface). Node 112 can determine that the counter is not less than the limit, and refrain from forwarding interest 160 via the outgoing interface "IF_112." Node 112 can wait (e.g., for a predetermined period of time), and then the condition (of whether the counter is less than the limit), or continue to check the condition at predetermined intervals, for a predetermined period of time. For example, if one of the 18 outstanding interests is satisfied (e.g., node 112 receives and processes a responsive content object, and accordingly decrements the counter by one from "18" to "17"), node 112 can forward interest 160 via the outgoing interface "IF_118."

Thus, by allowing the producer to determine and include maximum interest information in an advertisement for content under a certain domain or name prefix, a downstream router can add the interest limit to its FIB, and additionally distribute or allocate the interest limit to its downstream routers, as shown in relation to FIG. 1A. The routers can subsequently manage traffic based on the information in their FIBs. That is, the routers can throttle incoming interests based on the interest limits previously provided by an upstream producer or router. Thus, embodiments of the present invention provide a system which facilitates efficient communication based on information in the forwarding information base.

Exemplary Interests/Advertisements and Forwarding Information Bases

Figure 2A:
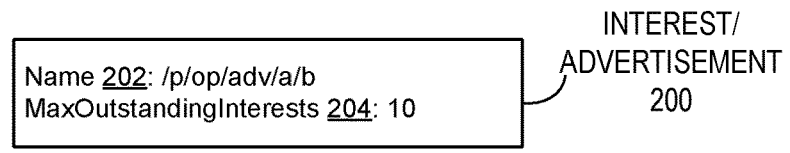
FIG. 2A illustrates an exemplary interest or advertisement where the maximum interest information is a maximum number of outstanding interests, in accordance with an embodiment of the present invention.

FIG. 2A illustrates an exemplary interest or advertisement 200 where the maximum interest information is a maximum number of outstanding interests, in accordance with an embodiment of the present invention. Interest 200 can include a name 202 of "/p/op/adv/a/b" and a maximum outstanding interests 204 field with a value of "10," which indicates that a downstream router cannot forward an interest to an upstream interface if there exists 10 unsatisfied or outstanding interest already forwarded to the same interface.

Figure 2B:
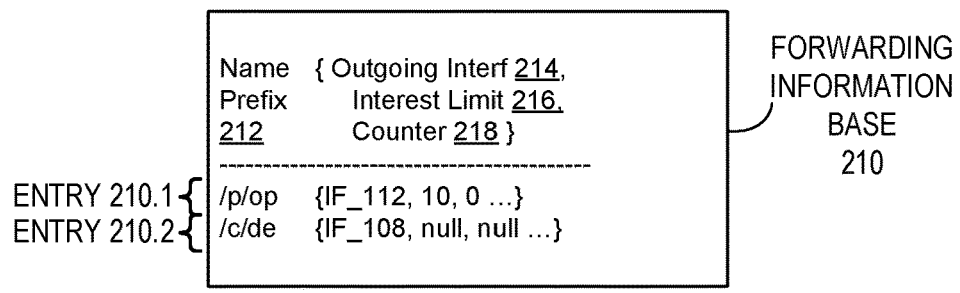
FIG. 2B illustrates an exemplary forwarding information base updated based on the exemplary interest or advertisement of FIG. 2A, in accordance with an embodiment of the present invention.

FIG. 2B illustrates an exemplary forwarding information base 210 updated based on the exemplary interest or advertisement of FIG. 2A, in accordance with an embodiment of the present invention. FIB 210 can include entries with a name prefix 212 and tuples comprised of an outgoing interface 214, an interest limit 216, and a counter 218. For example, FIB 210 can include an entry 210.1 with a name prefix of "/p/op," and a tuple consisting of an outgoing interface equal to "IF_112," an interest limit of 10, and a counter with a value of "0." Entry 210.1 corresponds to an update performed to FIB 210 by a router based on receiving interest 200. FIB 210 can also include an entry 210.2 with a name prefix of "/c/de," and a tuple consisting of an outgoing interface equal to "IF_108," an interest limit with a value of "null," and a counter with a value of "null."

Figure 2C:
FIG. 2C illustrates an exemplary interest or advertisement where the maximum interest information is a maximum rate of interests, in accordance with an embodiment of the present invention.

FIG. 2C illustrates an exemplary interest or advertisement 230 where the maximum interest information is a maximum rate of interests, in accordance with an embodiment of the present invention. Interest 230 can include a name 232 of "/p/op/adv/a/b" and a maximum outstanding interest rate 234 field with a value of "t," which indicates that a downstream router cannot forward an interest to an upstream interface if a computed sliding forwarding rate is more than the maximum interest rate, t.

Figure 2D:
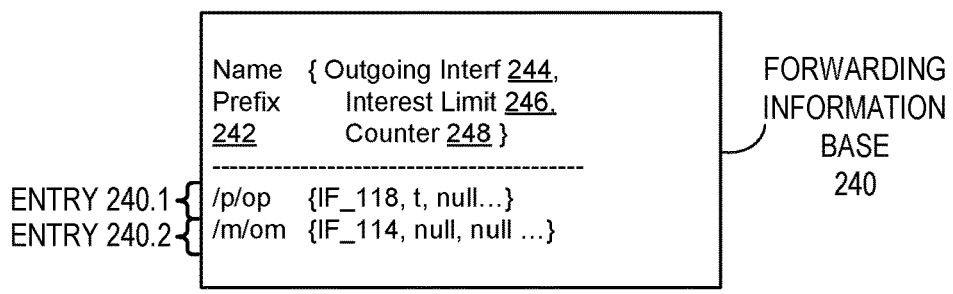
FIG. 2D illustrates an exemplary forwarding information base updated based on the exemplary interest or advertisement of FIG. 2C, in accordance with an embodiment of the present invention.

FIG. 2D illustrates an exemplary forwarding information base 240 updated based on the exemplary interest or advertisement of FIG. 2C, in accordance with an embodiment of the present invention. FIB 240 can include entries with a name prefix 242 and tuples comprised of an outgoing interface 244, an interest limit 246, and a counter 248. For example, FIB 240 can include an entry 240.1 with a name prefix of "/p/op," and a tuple consisting of an outgoing interface equal to "IF_118," an interest limit of t, and a counter with a value of "null." In some embodiments, the counter includes information associated with both the number of interests forwarded and a corresponding time period, and can also include the most recently computed sliding forwarding rate for the entry. Entry 240.1 corresponds to an update performed to FIB 240 by a router based on receiving interest 230. FIB 240 can also include an entry 240.2 with a name prefix of "/m/om," and a tuple consisting of an outgoing interface equal to "IF_114," an interest limit with a value of "null," and a counter with a value of "null."

Intermediate Router Facilitates FIB-Based Traffic Throttling

Figure 3A:
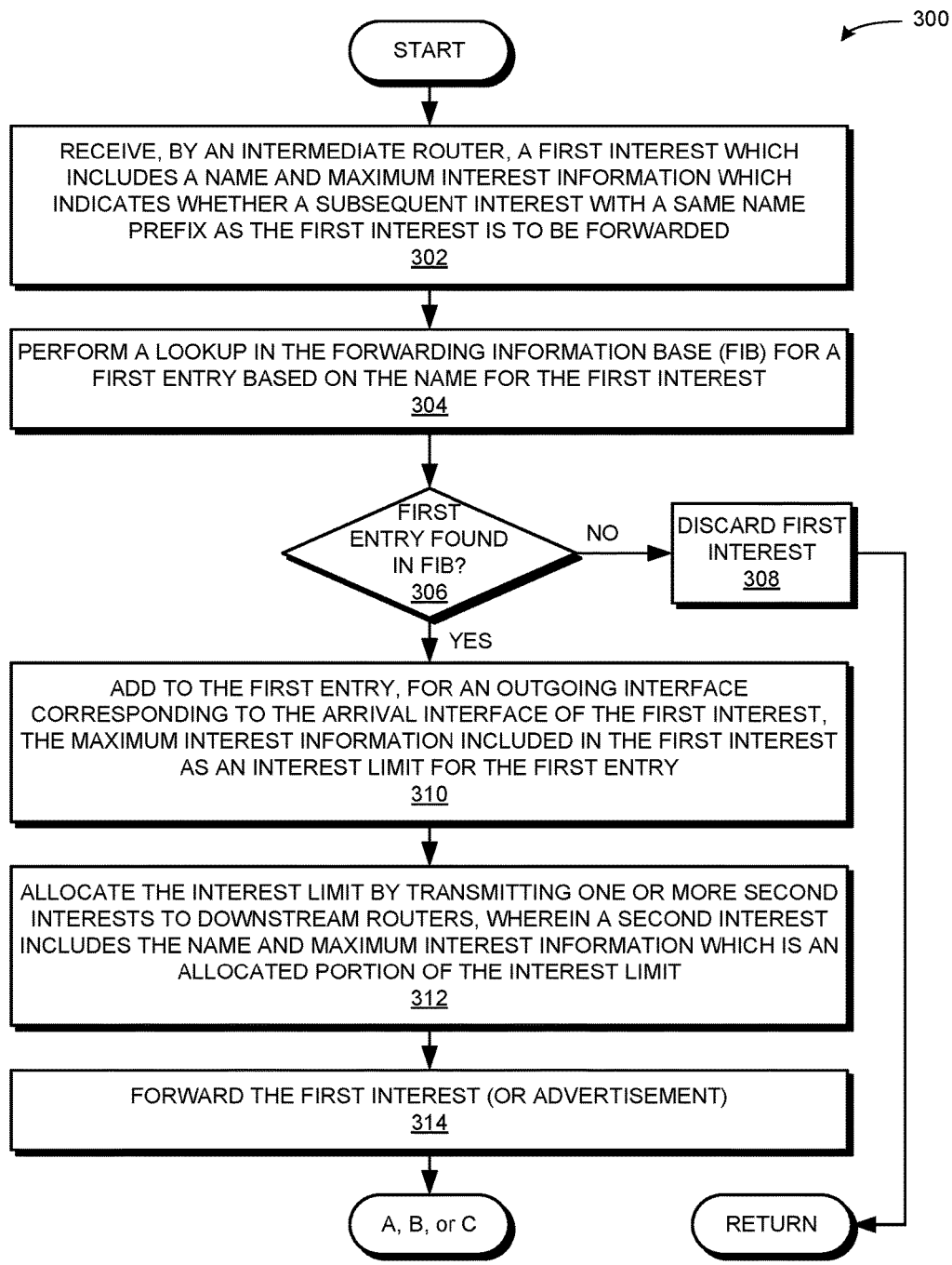
FIG. 3A presents a flow chart illustrating a method by an intermediate router for facilitating efficient communication based on a forwarding information base, in accordance with an embodiment of the present invention.

FIG. 3A presents a flow chart 300 illustrating a method by an intermediate router for facilitating efficient communication based on a forwarding information base, in accordance with an embodiment of the present invention. During operation, the system receives, by an intermediate router, a first interest which include a name and maximum interest information which indicates whether a subsequent interest with a same name prefix as the first interest is to be forwarded (operation 302). The first interest can be an advertisement which does not leave state in a pending interest table or require a responsive content object. A name can be a hierarchically structured variable length identifier that includes contiguous name components ordered from a most general level to a most specific level, and a name prefix can include one or more of the contiguous name components of the name. The system performs a lookup in the forwarding information base (FIB) for a first entry based on the name for the first interest (operation 304). An entry in a FIB can include a name prefix and one or more tuples comprised of an outgoing interface, an interest limit, and a counter which is a number that tracks a number of interests forwarded on the respective outgoing interface. If the first entry is not found in the FIB (decision 306), the system can discard the first interest (operation 308), and the operation returns. If the first entry is obtained from or found in the FIB (decision 306), the system adds to the first entry, for an outgoing interface corresponding to the arrival interface of the first interest, the maximum interest information included in the first interest as an interest limit for the first entry (operation 310).

The system can allocate the interest limit by transmitting one or more second interests to downstream routers, wherein a second interest includes the name and maximum interest information which is an allocated portion of the interest limit (operation 312). The sum of the allocated portions of the second interests is equal to the interest limit. The system can allocate the interest limit based on an equal division or distribution. The system can also allocate the interest limit unequally based on system parameters, perceived network conditions, or other strategy or scheduling constraints of the system. The system can forward the first interest (or advertisement) as appropriate (operation 314). The operation can continue as described at any of Labels A, B, or C of FIGS. 3B, 3C, and 3D, respectively.

Figure 3B:
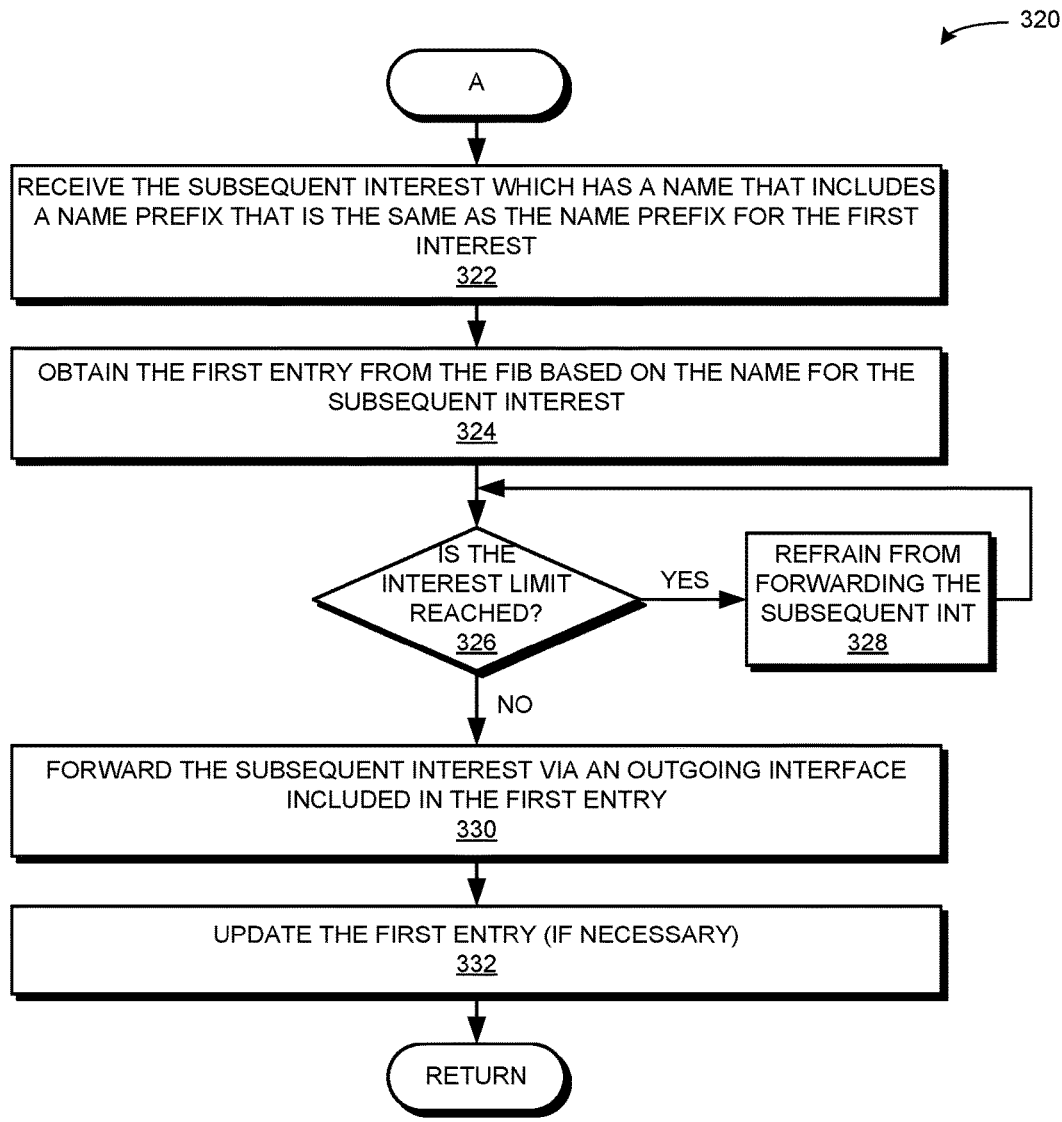
FIG. 3B presents a flow chart illustrating a method by an intermediate router for facilitating efficient communication based on a forwarding information base, including receiving and processing a subsequent interest, in accordance with an embodiment of the present invention.

FIG. 3B presents a flow chart 320 illustrating a method by an intermediate router for facilitating efficient communication based on a forwarding information base, including receiving and processing a subsequent interest, in accordance with an embodiment of the present invention. During operation, the system receives, by the intermediate router, the subsequent interest which has a name that includes a name prefix that is the same as the name prefix for the first interest (operation 322). The system obtains the first entry from the FIB based on the name for the subsequent interest (operation 324). If the interest limit (as indicated in the first entry for a corresponding outgoing interface) is reached (decision 326), the system refrains from forwarding the subsequent interest to that outgoing interface (operation 328). The system can wait until the interest limit changes (e.g., the intermediate router receives and processes another advertisement, and updates the interest limit in the FIB to a greater number or a higher rate). The system can also wait until the interest limit is no longer reached (e.g., the counter is less than the interest limit, due to the router satisfying an outstanding interest via the specific outgoing interface, and decrementing the counter for that interface).

If the interest limit is not reached (operation 326), the system forwards the subsequent interest via the specific outgoing interface included in the first entry (operation 330). The system can update the first entry, if necessary (operation 332) (e.g., by incrementing the counter, if the interest limit is a maximum number of outstanding interests).

Figure 3C:
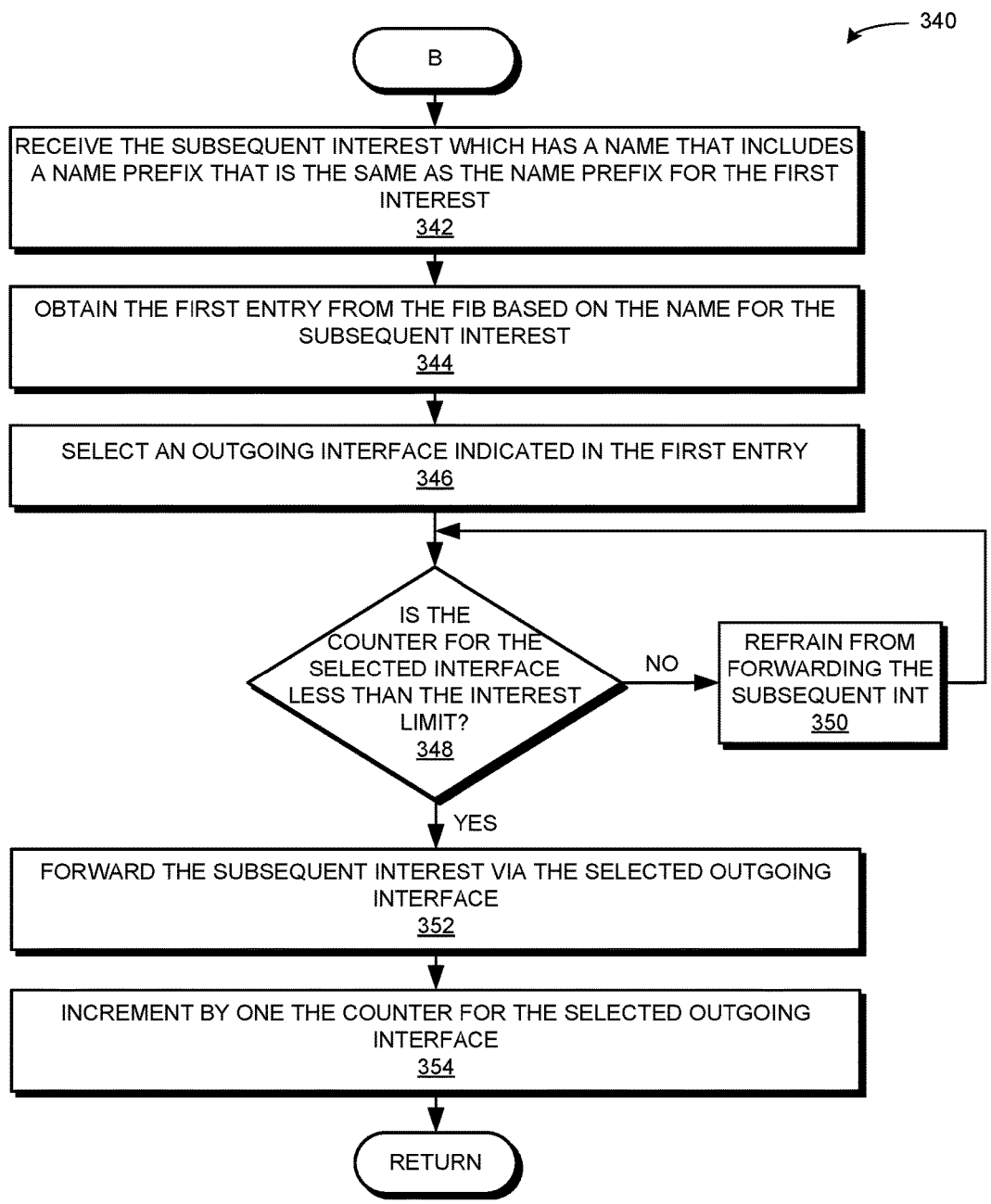
FIG. 3C presents a flow chart illustrating a method by an intermediate router for facilitating efficient communication based on a forwarding information base, based on a maximum number of outstanding interests, in accordance with an embodiment of the present invention.

Intermediate Router Facilitates FIB-Based Traffic Throttling: Maximum Number of Outstanding Interests FIG. 3C presents a flow chart 340 illustrating a method by an intermediate router for facilitating efficient communication based on a forwarding information base, based on a maximum number of outstanding interests, in accordance with an embodiment of the present invention. During operation, the system receives, by the intermediate router, the subsequent interest which has a name that includes a name prefix that is the same as the name prefix for the first interest (operation 342). The system obtains the first entry from the FIB based on the name for the subsequent interest (operation 344). The system selects an outgoing interface indicated in the first entry (operation 346). If the counter for the selected outgoing interface is not less than the corresponding interest limit (decision 348), the system refrains from forwarding the subsequent interest to the selected outgoing interface (operation 350). As described above in relation to operation 328 of FIG. 3B, the system can wait, and continue to check whether the counter is less than the interest limit.

If the counter for the selected outgoing interface is less than the corresponding interest limit (decision 348), the system can forward the subsequent interest via the selected outgoing interface (operation 352), and increment by one the counter for the selected outgoing interface (operation 354).

Figure 3D:
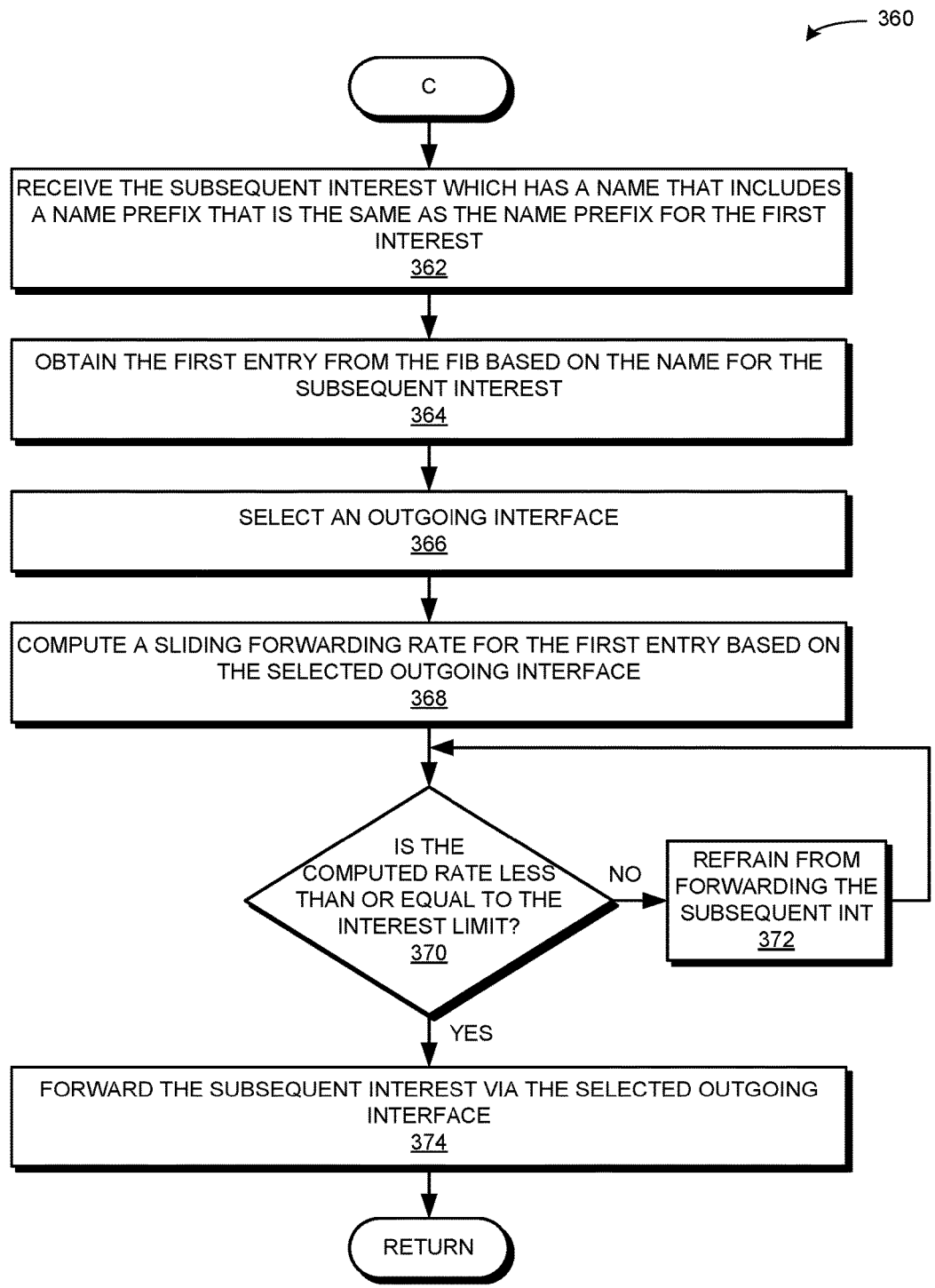
FIG. 3D presents a flow chart illustrating a method by an intermediate router for facilitating efficient communication based on a forwarding information base, based on a maximum rate of outstanding interests, in accordance with an embodiment of the present invention.

Intermediate Router Facilitates FIB-Based Traffic Throttling: Maximum Rate of Interests FIG. 3D presents a flow chart 360 illustrating a method by an intermediate router for facilitating efficient communication based on a forwarding information base, based on a maximum rate of outstanding interests, in accordance with an embodiment of the present invention. During operation, the system receives, by the intermediate router, the subsequent interest which has a name that includes a name prefix that is the same as the name prefix for the first interest (operation 362). The system obtains the first entry from the FIB based on the name for the subsequent interest (operation 364). The system selects an outgoing interface indicated in the first entry (operation 366). The system computes a sliding forwarding rate for the first entry based on the selected outgoing interface. The rate can be based on a number of outstanding interests sent via the selected outgoing interface, which can be indicated and tracked by the counter. The system can compute the sliding forwarding rate using any sliding average algorithm, e.g., by computing the average number of outstanding interests every second. If the computed rate is not less than or equal to the interest limit (decision 370), the system refrains from forwarding the subsequent interest to the selected outgoing interface (operation 372). As described above in relation to operation 328 of FIG. 3B, the system can wait, and continue to check whether the counter is less than the interest limit.

If the computed rate is less than or equal to the interest limit (decision 370), the system can forward the subsequent interest via the selected outgoing interface (operation 374). The system can also indicate in the counter the transmittal of the interest, for a certain time period, such that the counter can track and include information that the system can subsequently use to calculate the sliding forwarding rate for the entry.

Content Producing Device Facilitates FIB-Based Traffic Throttling

Figure 4:
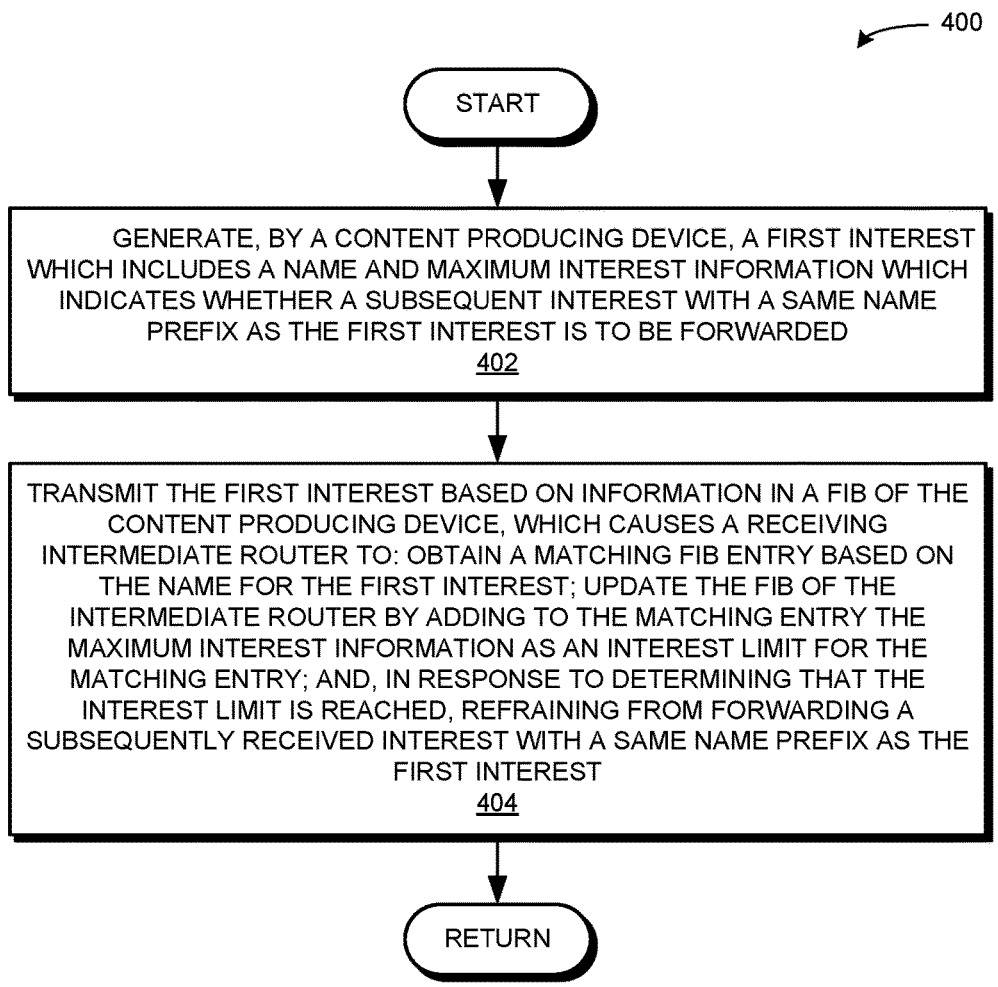
FIG. 4 presents a flow chart illustrating a method by a content producing device for facilitating efficient communication based on a forwarding information base, in accordance with an embodiment of the present invention.

FIG. 4 presents a flow chart 400 illustrating a method by a content producing device for facilitating efficient communication based on a forwarding information base, in accordance with an embodiment of the present invention. During operation, the system generates, by a content producing device, a first interest that includes a name and maximum interest information which indicates whether a subsequent interest with a same name prefix as the first interest is to be forwarded (operation 402). The first interest can be an advertisement of the content producing device for content under a domain of the content producing device. The advertisement does not require a responsive content object and does not leave state information in a pending interest table. The system transmits the first interest based on information in a FIB of the content producing device, which causes a receiving intermediate router to: obtain a matching FIB entry based on the name for the first interest; update the FIB of the intermediate router by adding to the matching entry the maximum interest information as an interest limit for the matching entry; and, in response to determining that the interest limit is reached, refrain from forwarding a subsequently received interest with a same name prefix as the first interest (operation 404).

Exemplary Computer System

Figure 5:
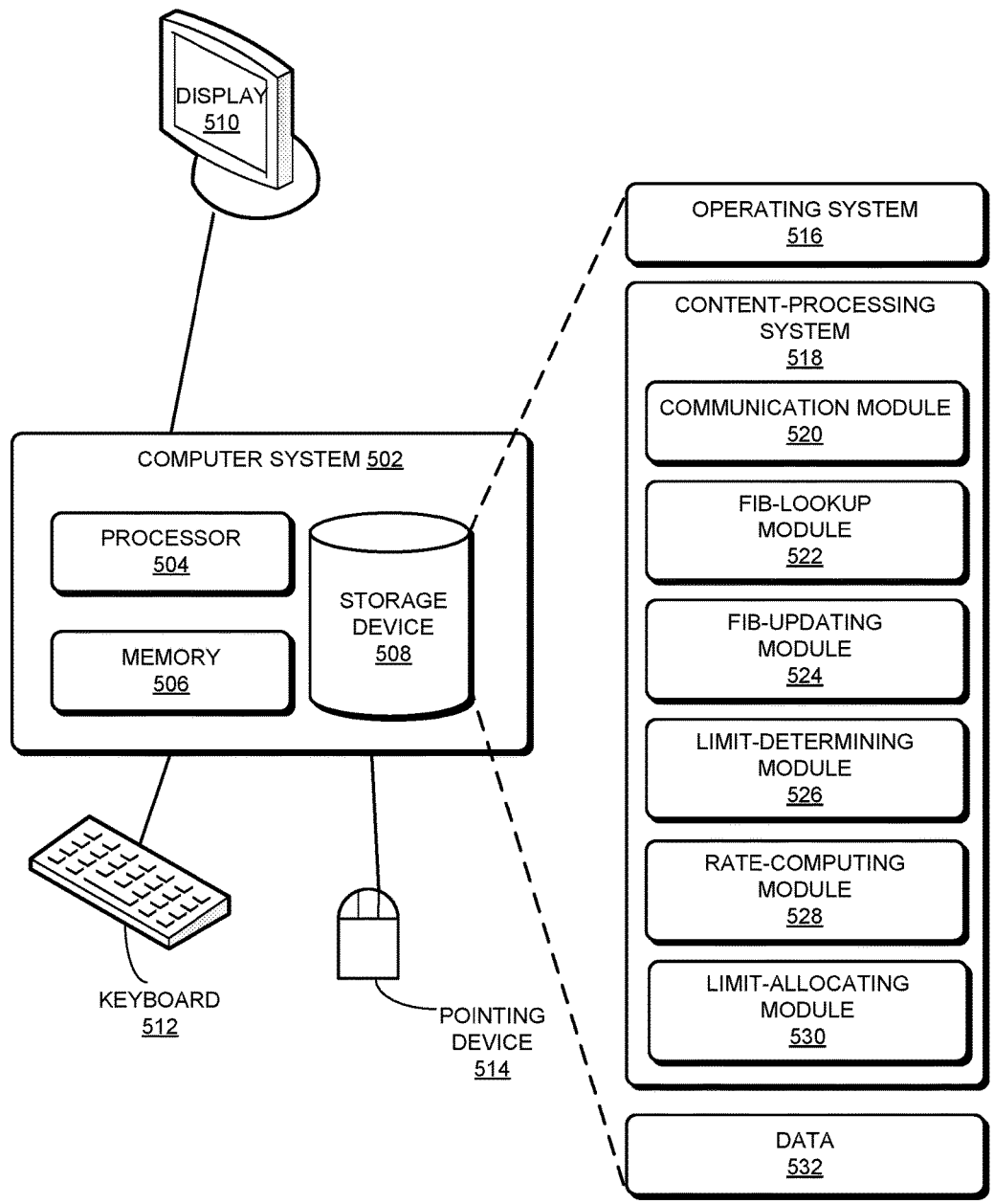
FIG. 5 illustrates an exemplary computer system that facilitates efficient communication based on a forwarding information base, in accordance with an embodiment of the present invention.

FIG. 5 illustrates an exemplary computer system 502 that facilitates efficient communication based on a forwarding information base, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 532.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network, such as a content centric network (communication module 520). A data packet can include an advertisement, an interest packet, or a content object packet with a name which is an HSVLI that includes contiguous name components ordered from a most general level to a most specific level.

Further, content-processing system 518 can include instructions for receiving, by an intermediate node, a first interest that includes a name and maximum interest information which indicates whether to forward a subsequent interest with a same name prefix as the first interest (communication module 520). Content-processing system 518 can also include instructions for, in response to obtaining a first entry from a forwarding information base based on the name for the first interest (FIB-lookup module 522), adding to the first entry, for an outgoing interface corresponding to an arrival interface of the first interest, the maximum interest information included in the first interest as an interest limit for the first entry (FIB-updating module 524). Content-processing system 518 can include instructions for receiving the subsequent interest (communication module 520). Content-processing system 518 can further include instructions for, in response to determining that the interest limit for the first entry is reached (limit-determining module 526), refraining from forwarding the subsequent interest (communication module 520). Content-processing system 518 can include instructions for allocating the interest limit by transmitting one or more second interests to downstream routers (limit-allocating module 530).

Content-processing system 518 can additionally include instructions for selecting an outgoing interface (limit-determining module 526). Content-processing system 518 can include instructions for, in response to determining that the counter for the selected outgoing interface is less than the interest limit (limit-determining module 526): forwarding the subsequent interest via the selected outgoing interface (communication module 520); and incrementing by one the counter for the selected outgoing interface (FIB-updating module 524). Content-processing system 518 can also include instructions for, in response to determining that the counter for the selected outgoing interface is not less than the interest limit (limit-determining module 526), refraining from forwarding the subsequent interest via the selected outgoing interface (communication module 520).

Content-processing system 518 can further include instructions for selecting an outgoing interface (limit-determining module 526). Content-processing system 518 can include instructions for computing a sliding forwarding rate for the first entry based on the selected outgoing interface (rate-computing module 528). Content-processing system 518 can also include instructions for, in response to determining that the computed rate is less than or equal to the interest limit (limit-determining module 526), forwarding the subsequent interest via the selected outgoing interface (communication module 520). Content-processing system 518 can include instructions for, in response to determining that the computed rate is greater than the interest limit (limit-determining module 526), refraining from forwarding the subsequent interest via the selected outgoing interface (communication module 520).

Data 532 can include any data that is required as input or that is generated as output by the methods and/or processes described in this disclosure. Specifically, data 532 can store at least: an interest; an advertisement; a content object; a name; a name that is an HSVLI that includes contiguous name components ordered from a most general level to a most specific level; a routable prefix or a name prefix that indicates one or more contiguous name components beginning from the most general level; maximum interest information; an interest limit; a forwarding information base (FIB); an entry in a FIB; a pending interest table (PIT); a tuple comprised of an outgoing interface, an interest limit, and a counter; an allocation of an interest limit; an algorithm for computing a sliding forwarding rate for a FIB entry; a method for an even distribution; a method for an uneven distribution; perceived network conditions; a method for a dynamic or a static distribution; an outstanding interest which is an interest which is forwarded and has not been satisfied by a responsive content object; a maximum number of outstanding interests to be forwarded based on a name prefix; an outgoing interface; and a maximum rate of interests to be forwarded based on a name prefix.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating traffic throttling based on a forwarding information base, the system comprising:
    a processor; and
    a storage device storing instructions that when executed by the processor cause the processor to perform a method, the method comprising:
        receiving, by an intermediate node, a first interest which includes a name and maximum interest information, wherein the name is a hierarchically structured variable length identifier that includes contiguous name components ordered from a most general level to a most specific level, and wherein the maximum interest information indicates whether to forward a subsequent interest with a same name prefix as the first interest;
        in response to obtaining a first entry from a forwarding information base based on the name for the first interest, adding to the first entry, for an outgoing interface corresponding to an arrival interface of the first interest, the maximum interest information included in the first interest as an interest limit for the first entry;
        receiving the subsequent interest; and
        in response to determining that the interest limit for the first entry is reached, refraining from forwarding the subsequent interest,
    thereby facilitating the intermediate node to manage traffic based on information in the forwarding information base provided by a content producer.

2. The computer system of claim 1, wherein an entry in the forwarding information base includes:
    a name prefix which includes one or more contiguous name components of the name; and one or more tuples comprised of an outgoing interface, an interest limit, and a counter which is a number that tracks a number of outstanding interests forwarded on the respective outgoing interface, wherein an outstanding interest is an interest which is forwarded and has not been satisfied by a responsive content object.

3. The computer system of claim 2, wherein the method further comprises:
allocating the interest limit by transmitting one or more second interests to downstream routers, wherein a second interest includes the name and maximum interest information which is an allocated portion of the interest limit, wherein a sum of the allocated portions is equal to the interest limit, and wherein allocating the interest limit is based on one or more of:
an even distribution based on an equal or similar distribution;
an uneven distribution based on network conditions; and
a dynamic or a static distribution.

4. The computer system of claim 2, wherein the maximum interest information included in the first interest is a maximum number of outstanding interests to be forwarded based on the name prefix.

5. The computer system of claim 4, wherein the method further comprises determining whether the interest limit for the first entry is reached, which comprises:
selecting an outgoing interface;
in response to determining that the counter for the selected outgoing interface is less than the interest limit:
forwarding the subsequent interest via the selected outgoing interface;
incrementing by one the counter for the selected outgoing interface; and
in response to determining that the counter for the selected outgoing interface is not less than the interest limit, refraining from forwarding the subsequent interest via the selected outgoing interface.

6. The computer system of claim 2, wherein the maximum interest information included in the first interest is a maximum rate of interests to be forwarded based on the name prefix.

7. The computer system of claim 6, wherein the method further comprises determining whether the interest limit for the first entry is reached, which comprises:
selecting an outgoing interface;
computing a sliding forwarding rate for the first entry based on the selected outgoing interface;
in response to determining that the computed rate is less than or equal to the interest limit, forwarding the subsequent interest via the selected outgoing interface; and
in response to determining that the computed rate is greater than the interest limit, refraining from forwarding the subsequent interest via the selected outgoing interface.

8. A computer-implemented method for facilitating traffic throttling based on a forwarding information base, the method comprising:
receiving, by an intermediate node, a first interest which includes a name and maximum interest information, wherein the name is a hierarchically structured variable length identifier that includes contiguous name components ordered from a most general level to a most specific level, and wherein the maximum interest information indicates whether to forward a subsequent interest with a same name prefix as the first interest;
in response to obtaining a first entry from a forwarding information base based on the name for the first interest, adding to the first entry, for an outgoing interface corresponding to an arrival interface of the first interest, the maximum interest information included in the first interest as an interest limit for the first entry;
receiving the subsequent interest; and
in response to determining that the interest limit for the first entry is reached, refraining from forwarding the subsequent interest,
thereby facilitating the intermediate node to manage traffic based on information in the forwarding information base provided by a content producer.

9. The method of claim 8, wherein an entry in the forwarding information base includes:
a name prefix which includes one or more contiguous name components of the name; and
one or more tuples comprised of an outgoing interface, an interest limit, and a counter which is a number that tracks a number of outstanding interests forwarded on the respective outgoing interface, wherein an outstanding interest is an interest which is forwarded and has not been satisfied by a responsive content object.

10. The method of claim 9, further comprising:
allocating the interest limit by transmitting one or more second interests to downstream routers, wherein a second interest includes the name and maximum interest information which is an allocated portion of the interest limit, wherein a sum of the allocated portions is equal to the interest limit, and wherein allocating the interest limit is based on one or more of:
an even distribution based on an equal or similar distribution;
an uneven distribution based on network conditions; and
a dynamic or a static distribution.

11. The method of claim 9, wherein the maximum interest information included in the first interest is a maximum number of outstanding interests to be forwarded based on the name prefix.

12. The method of claim 11, further comprising determining whether the interest limit for the first entry is reached, which comprises:
selecting an outgoing interface;
in response to determining that the counter for the selected outgoing interface is less than the interest limit:
forwarding the subsequent interest via the selected outgoing interface;
incrementing by one the counter for the selected outgoing interface; and
in response to determining that the counter for the selected outgoing interface is not less than the interest limit, refraining from forwarding the subsequent interest via the selected outgoing interface.

13. The method of claim 9, wherein the maximum interest information included in the first interest is a maximum rate of interests to be forwarded based on the name prefix.

14. The method of claim 13, further comprising determining whether the interest limit for the first entry is reached, which comprises:
selecting an outgoing interface;
computing a sliding forwarding rate for the first entry based on the selected outgoing interface;

in response to determining that the computed rate is less than or equal to the interest limit, forwarding the subsequent interest via the selected outgoing interface; and in response to determining that the computed rate is greater than the interest limit, refraining from forwarding the subsequent interest via the selected outgoing interface.

15. A non-transitory computer-readable storage medium storing instructions that when executed by a computer cause the computer to perform a method, the method comprising:

receiving, by an intermediate node, a first interest which includes a name and maximum interest information, wherein the name is a hierarchically structured variable length identifier that includes contiguous name components ordered from a most general level to a most specific level, and wherein the maximum interest information indicates whether to forward a subsequent interest with a same name prefix as the first interest;

in response to obtaining a first entry from a forwarding information base based on the name for the first interest, adding to the first entry, for an outgoing interface corresponding to an arrival interface of the first interest, the maximum interest information included in the first interest as an interest limit for the first entry;

receiving the subsequent interest; and in response to determining that the interest limit for the first entry is reached, refraining from forwarding the subsequent interest, thereby facilitating the intermediate node to manage traffic based on information in the forwarding information base provided by a content producer.

16. The storage medium of claim 15, wherein an entry in the forwarding information base includes:

a name prefix which includes one or more contiguous name components of the name; and one or more tuples comprised of an outgoing interface, an interest limit, and a counter which is a number that tracks a number of outstanding interests forwarded on the respective outgoing interface, wherein an outstanding interest is an interest which is forwarded and has not been satisfied by a responsive content object.

17. The storage medium of claim 16, wherein the method further comprises:

allocating the interest limit by transmitting one or more second interests to downstream routers, wherein a second interest includes the name and maximum interest information which is an allocated portion of the interest limit, wherein a sum of the allocated portions is equal to the interest limit, and wherein allocating the interest limit is based on one or more of:

an even distribution based on an equal or similar distribution;

an uneven distribution based on network conditions; and a dynamic or a static distribution.

18. The storage medium of claim 16, wherein the maximum interest information included in the first interest is a maximum number of outstanding interests to be forwarded based on the name prefix.

19. The storage medium of claim 18, wherein the method further comprises determining whether the interest limit for the first entry is reached, which comprises:

selecting an outgoing interface;

in response to determining that the counter for the selected outgoing interface is less than the interest limit:

forwarding the subsequent interest via the selected outgoing interface;

incrementing by one the counter for the selected outgoing interface; and in response to determining that the counter for the selected outgoing interface is not less than the interest limit, refraining from forwarding the subsequent interest via the selected outgoing interface.

20. The storage medium of claim 16, the maximum interest information included in the first interest is a maximum rate of interests to be forwarded based on the name prefix, and wherein the method further comprises determining whether the interest limit for the first entry is reached, which comprises:

selecting an outgoing interface;

computing a sliding forwarding rate for the first entry based on the selected outgoing interface;

in response to determining that the computed rate is less than or equal to the interest limit, forwarding the subsequent interest via the selected outgoing interface; and in response to determining that the computed rate is greater than the interest limit, refraining from forwarding the subsequent interest via the selected outgoing interface.

* * * * *